Patented July 17, 1951

2,561,190

UNITED STATES PATENT OFFICE 2,561,190

PREPARATION OF 2-METHYL-5-BENZOYL BENZOXAZOLE AND CYCLAMMONIUM SALTS THEREOF

John Charles Firestine, South River, N. J., assignor to E. I. du Pont de Nemours and Company, Wilmington, Del., a corporation of Delaware No Drawing. Application June 25, 1949, Serial No. 101,492

5 Claims. (Cl. 260—307)

This invention relates to the preparation of new oxazole compounds. More particularly, it relates to the preparation of 2-methyl-5-benzoyl benzoxazole and its cyclammonium salts.

An object of this invention is to provide new and useful oxazole compounds. A further object is to provide such compounds which contain a reactive methyl group in the alpha position to the heterocyclic nitrogen atoms. A still further object is to provide a new class of oxazole cyclammonium salts which contain such a reactive methyl group and are capable of entering into cyanine dye condensation reactions. Still other objects will be apparent from the following description of the invention.

It has been found that 2-methyl-5-benzoyl benzoxazole can be prepared in a practical manner by reacting p-hydroxybenzophenone dissolved in a solvent with nitric acid to yield m-nitro-p-hydroxybenzophenone. The latter compound can then readily be reduced by means of powdered metal in acid solution to the corresponding amino compound which can be simultaneously or subsequently condensed with acetic anhydride to yield 2-methyl-5-benzoyl benzoxazole which has the structural formula:

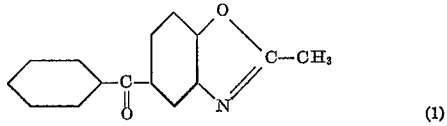

(1)

The compound of Formula 1 can readily be converted into new cyclammonium salts or quaternary salts by reaction with an alkyl or aralkyl salt, e. g., an alkyl halide including ethyl bromide and methyl chloride, ethyl- and methyl-p-toluene sulfonate, dialkyl sulfate, e. g., diethyl sulfate and dimethyl sulfate, ethyl perchlorate, etc. The former salts may be represented by the general formula:

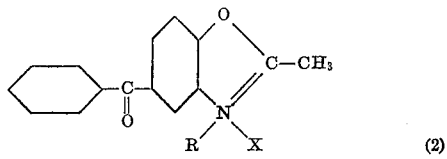

(2)

wherein R is an alkyl or aralkyl radical, e. g., methyl and ethyl and benzyl, and X represents the negative radical of an acid, e. g., Cl, Br, I, $SO_4CH_3$, $ClO_4$, —$SO_3C_6H_5CH_3$, etc.

The compounds of Formula 2 have been found to react similarly to 2-methyl benzthiazole quaternary salts with other reactive heterocyclic nitrogen salts to form various mono- and polymethine dyes. The bases can be simultaneously reacted with alkyl salts and condensed to form a cyanine dye if desired. However, the stepwise method is, in general, preferable to the simultaneous salt formation and dye condensation reaction.

Symmetrical carbocyanine dyes can be made by reacting two molecules of a 2-methyl-5-benzoyl benzoxazole quaternary salt with one mol of an ortho ester of a carboxylic acid.

The invention will be further illustrated but is not to be limited to the following examples. The parts are all by weight.

EXAMPLES

(a) The nitration of p-hydroxybenzophenone

Ninety grams of p-hydroxybenzophenone was dissolved in 150 cc. of glacial acetic acid and warmed to 50° C. Sixty grams of fuming nitric acid was then added dropwise at such a rate that the temperature lay between 45–50° C. When three-fourths of the nitric acid had been added, the nitro product crystallized and it was necessary to dilute the solution with another 100 cc. of acetic acid. When the nitric acid was completely added, the solution was stirred one-half hour longer and then poured into 3–4 volumes of cold water. The crystals were filtered, washed well with water and recrystallized from alcohol. The yield of m-nitro-p-hydroxybenzophenone was 75 grams of yellow sparkling crystals having a melting point of 94–94.5° C.

(b) Preparation of 2-methyl-5-benzoyl benzoxazole

Seventy-nine grams of the crystalline product obtained by nitration of p-hydroxybenzophenone in acetic acid was dissolved in 1000 cc. of acetic anhydride and heated to reflux. The heat source was then removed and the compound reduced by adding 150 grams of zinc dust in small portions. The reaction was violent and the additions were regulated accordingly. After the zinc had been added, the solution was refluxed for one hour longer and filtered from solid material. The filtrate was distilled up to 140° C. at 760 mm. pressure to remove excess acetic anhydride and then at 14 mm. to collect the product. 2-methyl-5-benzoyl benzoxazole distilled from 218–230° C./14 mm. as a clear viscous oil that solidified on cooling. It melted 103–103.5° C. The yield was 39 grams. The results are quite surprising since one would expect the carbonyl radical to be reduced and the benzyl derivative formed.

(c) Preparation of 2-methyl-5-benzoyl benzoxazole-alkyl salts 2-methyl-5-benzoyl benzoxazole (2.37 grams) was heated with diethyl sulphate (1.54 grams) at 130–140° C. for two hours and the quaternary salt of the following formula formed:

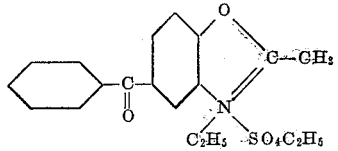

The corresponding ethyl iodide can be made by treatment with a hot aqueous solution of potassium iodide and cooled. The ethyl p-toluene sulfonate salt can be made by substituting the latter compound for the diethyl sulfate. Ethyl perchlorate, ethyl bromide and benzyl chloride when substituted in like manner for the diethyl sulfate form quaternary salts of the alkyl and aralkyl type.

This application is a continuation-in-part of application Serial No. 692,126, filed August 21, 1946, now U. S. Patent No. 2,521,705.

As many widely different embodiments of this invention can be made without departing from the spirit and scope thereof, it is to be understood that the invention is not to be limited except as defined by the claims.

What is claimed is:

1. The compounds taken from the group consisting of 2-methyl-5-benzoylbenzoxazole and its quaternary salts.
2. The 2-methyl-5-benzoylbenzoxazole quaternary salts.
3. The 2-methyl-5-benzoylbenzoxazole alkyl quaternary salts having 1 to 2 carbon atoms in the alkyl group.
4. 2-methyl-5-benzoylbenzoxazole.
5. The process which comprises nitrating p-hydroxybenzophenone, reducing the m-nitro-p-hydroxy-benzophenone to the corresponding amino compound and condensing the latter with acetic anhydride, and recovering 2-methyl-5-benzoyl-benzoxazole.

JOHN CHARLES FIRESTINE.

REFERENCES CITED

The following references are of record in the file of this patent:

UNITED STATES PATENTS

| Number | Name | Date |
|---|---|---|
| 1,745,843 | Clarke | Feb. 4, 1930 |
| 2,323,504 | Wilson | July 6, 1943 |
| 2,429,178 | Anish | Oct. 14, 1947 |